[19] United States Patent
Hayakawa et al.

[11] Patent Number: 5,929,794
[45] Date of Patent: Jul. 27, 1999

[54] DIGITAL INFORMATION DATA RECORDING AND REPRODUCING APPARATUS

[75] Inventors: Tomoo Hayakawa; Fumihiro Nagasawa, both of Kanagawa, Japan

[73] Assignee: Sony Corporation, Tokyo, Japan

[21] Appl. No.: 08/831,559

[22] Filed: Apr. 9, 1997

[30] Foreign Application Priority Data

Apr. 12, 1996 [JP] Japan ................................ 8-091532

[51] Int. Cl.⁶ .................................................. H04N 1/133
[52] U.S. Cl. ................................................ 341/87; 386/109
[58] Field of Search ........................... 341/87, 94, 95; 369/47, 48; 360/32, 55; 386/112, 109

[56] References Cited

U.S. PATENT DOCUMENTS

| 4,630,231 | 12/1986 | Hirata et al. | 364/900 |
| 5,245,427 | 9/1993 | Kunihiro | 358/133 |
| 5,446,597 | 8/1995 | Matsumi et al. | 360/19.1 |
| 5,596,564 | 1/1997 | Fukushima et al. | 369/275.3 |
| 5,621,840 | 4/1997 | Kawamura et al. | 386/68 |
| 5,642,338 | 6/1997 | Fukushima et al. | 369/59 |
| 5,754,553 | 5/1998 | Shimoda et al. | 370/341 |

*Primary Examiner*—Brian Young
*Assistant Examiner*—Peguy Jean Pierre
*Attorney, Agent, or Firm*—Frommer Lawrence & Haug, LLP.; William S. Frommer

[57] ABSTRACT

A digital information data recording and reproducing apparatus is disclosed which can reduce an ineffective data portion in a recording data and can effectively use a capacity of a recording medium such as a hard disk, etc. In the apparatus, after the digital information data is compressed and coded, it is subjected to a framing process which uses a fixed length format. An ineffective data is removed from a framing data of the fixed length format obtained by the framing process, and then the data is recorded in the recording medium.

4 Claims, 11 Drawing Sheets

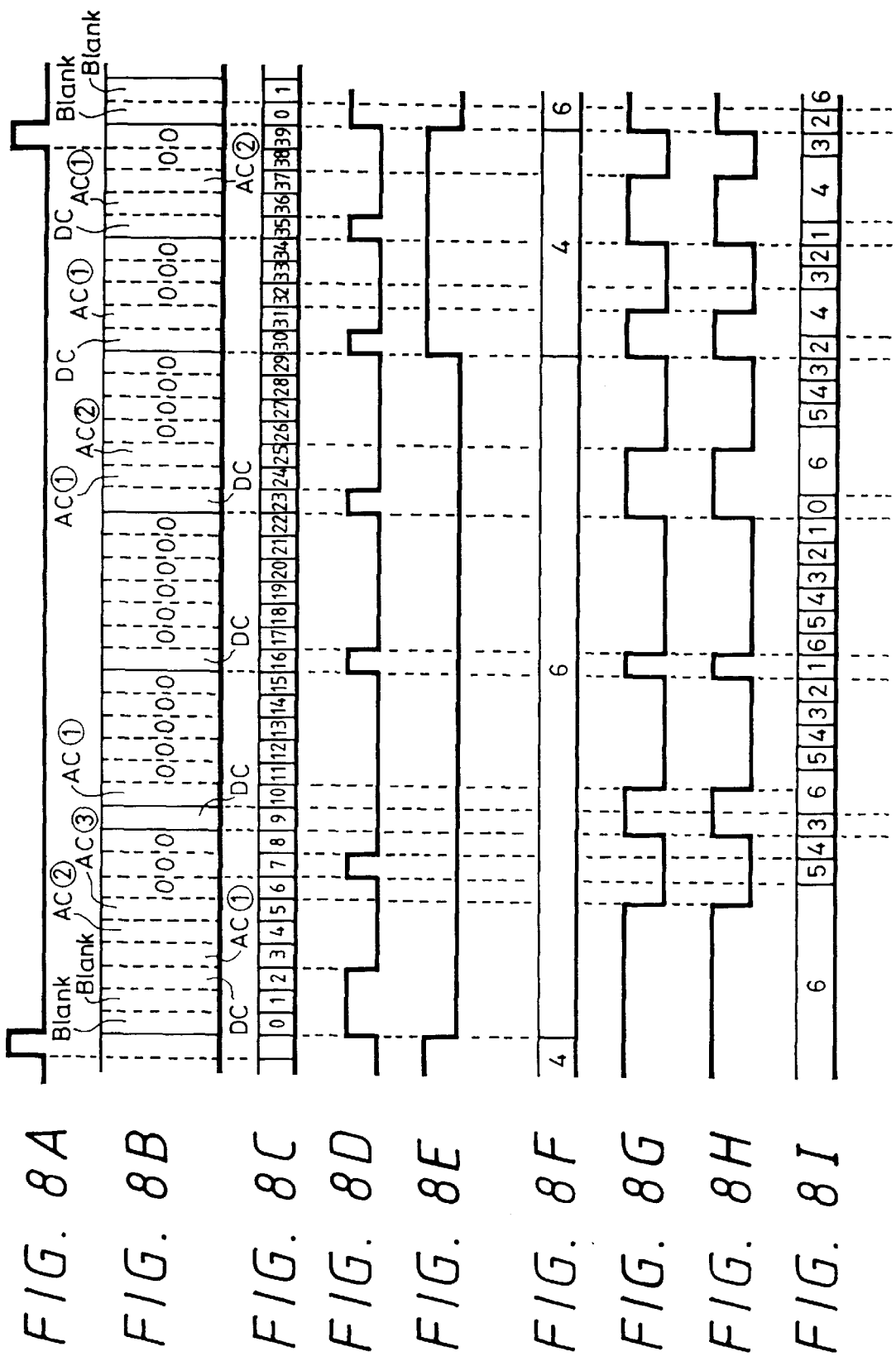

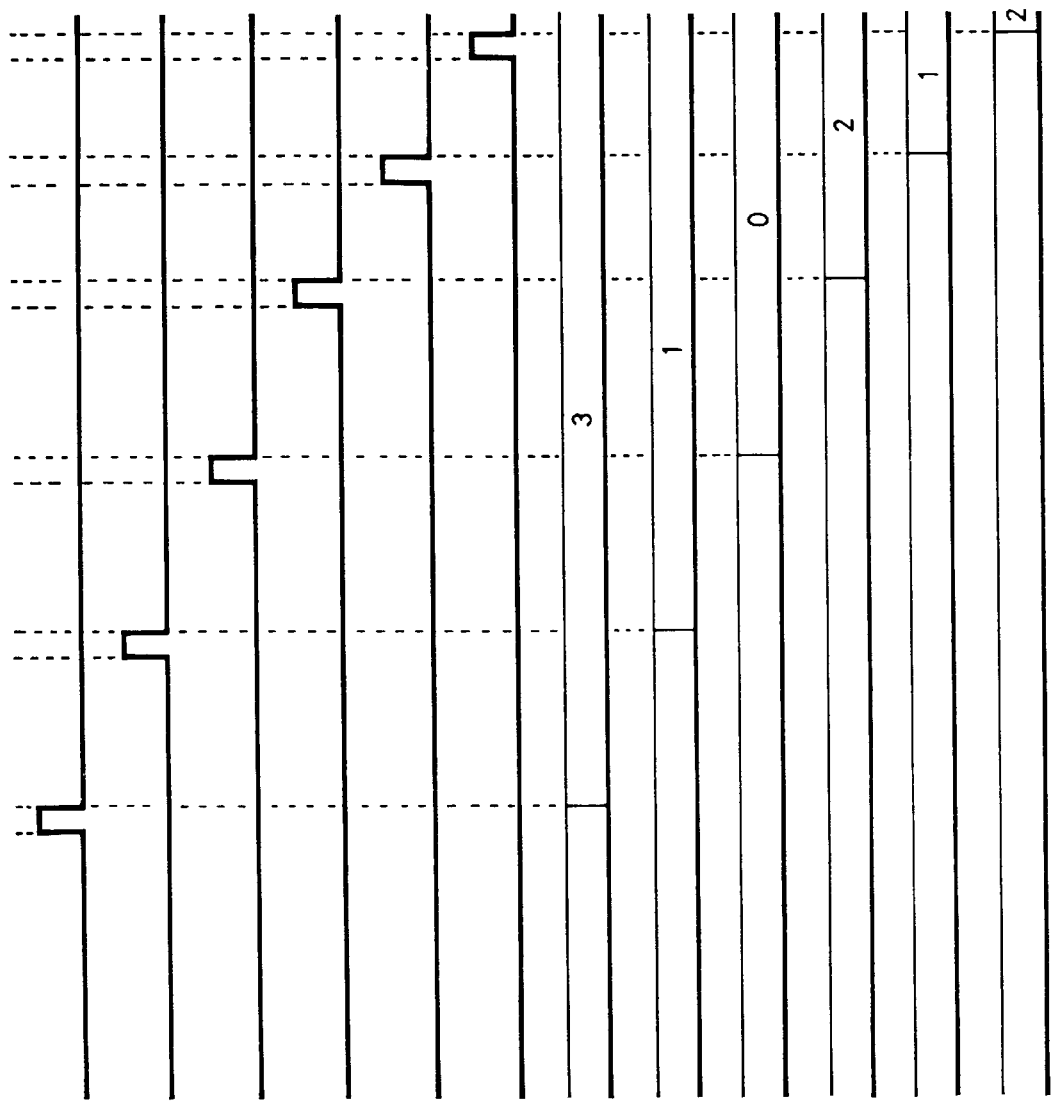

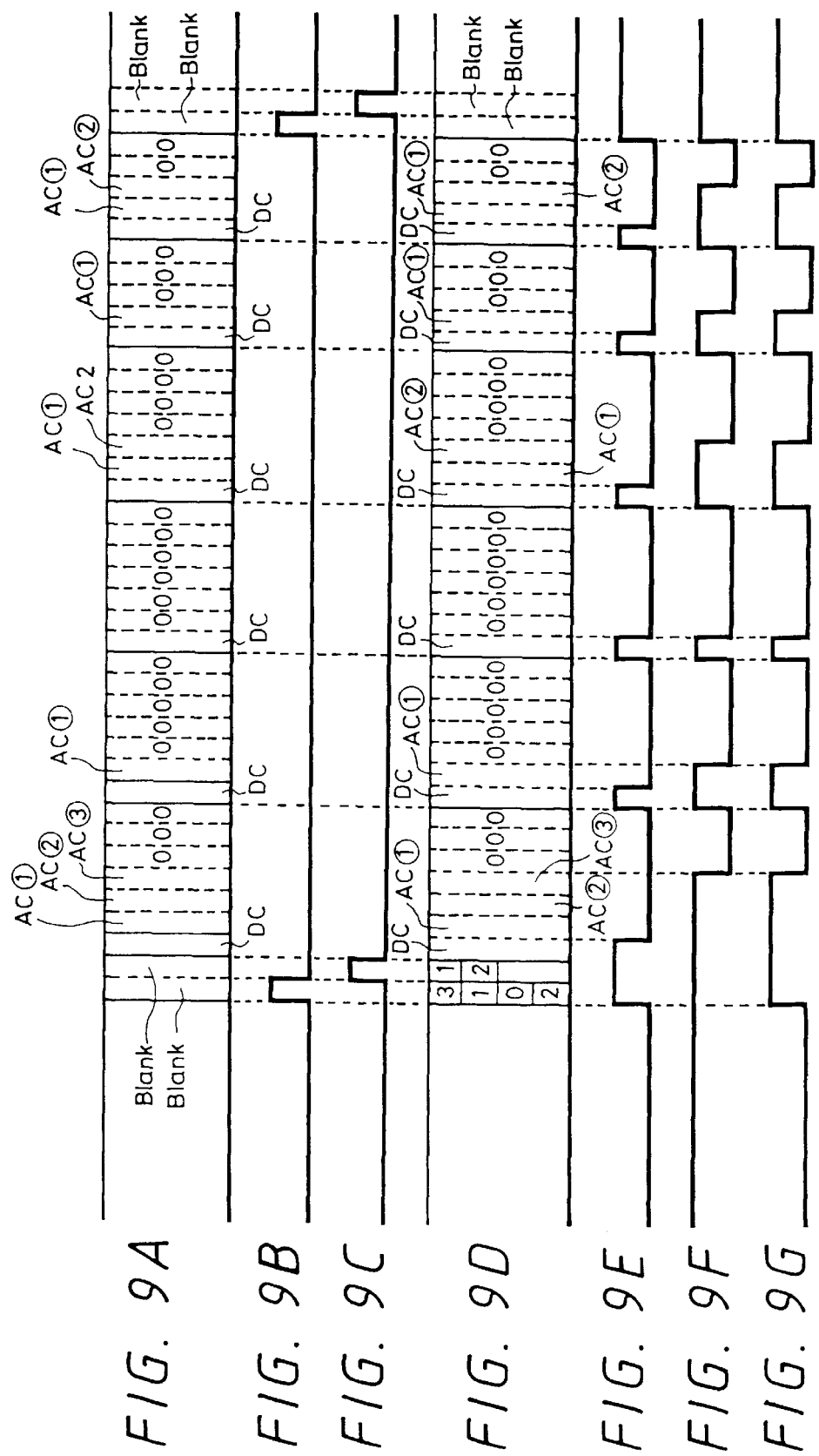

FIG. 11A
FIG. 11B
FIG. 11C
FIG. 11D
FIG. 11E
FIG. 11F
FIG. 11G
FIG. 11H
FIG. 11I
FIG. 11J
FIG. 11K

DIGITAL INFORMATION DATA RECORDING AND REPRODUCING APPARATUS

BACKGROUND OF THE INVENTION

The present invention relates to a digital information data recording and reproducing apparatus which is suitable for recording a digital image signal on a recording medium such as a disk, etc. and for reproducing it.

Heretofore, a digital information data recording apparatus for recording a digital information data such as a digital video signal, etc. on a recording medium such as a disk, etc. has been known. In general, since the digital video signal, etc. has much information, a highly efficient coding is adopted in order to compress a transmitted data amount. In various highly efficient codings, a practical use of a DCT (Discrete Cosine Transform) is advanced.

A digital information data recording apparatus shown in FIG. 1 is previously proposed as the digital information data recording device using the DCT. As shown FIG. 1, an input terminal 1 is supplied with a video data which a digitized video data. The video data supplied to the input terminal 1 is supplied to a blocking circuit 2.

In the blocking circuit 2, the video data in an order of an interlace scan is converted into a data having a structure of, for example, a DCT block (8×8). That is, two blocks (4×8) at the same spatial position in time-continuous first and second fields are combined to each other, so that the block (8×8) is formed. In the block (8×8), a pixel data on an odd-numbered line is included in the first field, and a pixel data on an even-numbered line is included in the second field.

An output from the blocking circuit 2 is supplied to a shuffling circuit 3. An error is concentrated by a drop out, etc., whereby a deterioration of an image quality is generated. In order to prevent the deterioration of the image quality, in the shuffling circuit 3, such a process that a plurality of macro blocks MB are defined as a unit in one frame and the spatial position is varied from an original position, that is, a shuffling is carried out. In this example, a shuffling unit is equal to a buffering unit BU, and the unit is defined as five micro blocks (5 MB).

The output from the shuffling circuit 3 is supplied to a DCT (cosine conversion) circuit 4 and a movement detecting circuit 5. A coefficient data of (8×8) (that is, the coefficient data of a direct current component DC and an alternating current component AC) is generated from the DCT circuit 4. Relating to a moving block, the DCT circuit 4 is switched in such a manner that the DCT in the field is carried out relative to the block (4×8) included in the block (8×8).

The macro block MB is a plurality of blocks in which the coefficient data of the block (8×8) per DCT block is collected. For example, in case of the video data of a component method (Y:CB:CR=4:1:1) of a 525/60 system, as shown in FIGS. 2A and 3, four Y blocks $Y_1$, $Y_2$, $Y_3$, $Y_4$, one CB block and one CR block at the same position in one frame, that is, the total six blocks constitute one macro block MB.

In case of a sampling frequency of fsc (fsc: color subcarrier frequency), the image in one frame is (910 samples×525 lines), and an effective data in the image is defined as (720 samples×480 lines). In the component method, the number of all the blocks in one frame is obtained by the following equation : (720×6/4)×480÷(8×8)=8100. Accordingly, 8100÷6=1350 is the number of the macro blocks MB in one frame.

The DC (direct current component) coefficient data in the coefficient data of (8×8) generated in the DCT circuit 4 is not compressed, and it is transmitted to the following-stage circuit. Remaining sixty-three AC coefficient data are supplied to a quantization circuit 7 via a buffer 6. As shown in FIG. 4, the AC coefficient data is sequentially transmitted from a low-order alternating current component to a high-order one in a zigzag-scan order. Furthermore, the AC coefficient data is also supplied to a classifying circuit 8 and a data amount estimate circuit 9.

The buffer 6 delays the coefficient data for a time necessary to determine an appropriate quantization number QNo by the estimate circuit 9. The buffer 6 is also to output each coefficient data of a still block and the moving block in a predetermined order. The quantization number QNo from the estimate circuit 9 is supplied to the quantization circuit 7, and also transmitted to the following stage.

The coefficient data from the DCT circuit 4 is generated in case of the DCT conversion in the frame. If the movement is detected by the movement detecting circuit 5, the DCT process in the field is selected. Specifically, it is an in-field DCT that the DCT is carried out for each of two blocks (4×8) at the same position in the time-continuous first and second fields.

If the block moves between the fields, the movement detecting circuit 5 detects the movement, and an in-frame DCT is changed into the in-field DCT in response to the detection. Based on a vertical coefficient data of when an Hadamard conversion is carried out relative to the image data in the block (8×8), a judgment of stillness/movement is carried out for every block. In addition, based on an absolute value of a difference between the fields, the movement may be detected.

In case of the in-field DCT, the coefficient data of the block (4×8) relating to the first field and the coefficient data of the block (4×8) relating to the second field are generated. As shown in FIG. 5, the coefficient data are processed as an arrangement of (8×8) located at upper and lower portions. A direct current component DC1 is included in the coefficient data in the first field. Similarly, a direct current component DC2 is also included in the second field. If the coefficient data in each field is independently processed, the following processes of the in-frame DCT and the in-field DCT must be processed independently of each other. As a result, there is such a problem that a scale of a hardware is increased, etc. Accordingly, instead of the direct current component DC2 in the second field, a differential direct current component Δ DC2=(=DC1−DC2) is transmitted.

A detection signal (movement flag) M from the movement detecting circuit 5 is supplied to the data amount estimate circuit 9. The movement flag M is inserted into the recording data in the following stage. In the data amount estimate circuit 9, the movement flag M is used in order to switch the order of outputting the coefficient data and the method of dividing an area according to the stillness/movement.

The quantization circuit 7 quantizes the alternating current component in the coefficient data. That is, in an appropriate quantization step, the AC coefficient data is divided, and its quotient is made as an integer. The quantization step is determined by the quantization number QNo from a QNo controller 10. In case of the digital information data recording apparatus, the process such as an edition, etc. is carried out by one field unit or one frame unit. Accordingly, it is necessary that a generated data amount per one field or one frame is a target value or less.

The data amount generated by the DCT and a variable length coding is changed according to a pattern to be coded.

Accordingly, in order that the generated data amount by a buffering unit shorter than one field or one frame period may be the target value or less, a buffering process is carried out. The buffering unit is shortened in order that a buffering circuit may be simplified, for example, a memory capacity for buffering may be reduced, etc. In this example, five macro blocks (5 MB) (=30 DCT blocks) are defined as a buffering unit BU.

Furthermore, the classifying circuit 8 examines a fineness of the pattern at the macro block MB unit. An activity of the macro block MB is classified into four-step classes. An 2-bit activity code AT indicative of the class is generated by the classifying circuit 10. The detected result is supplied to the QNo controller 10. Furthermore, the activity code AT is inserted into the recording data in the following stage.

The output from the quantization circuit 7 is supplied to a variable length coding circuit 11, and a run length coding, a Huffman coding and the like are carried out therein. For example, a run length being a continuous number of "0" of the coefficient data and the coefficient data value are provided for a Huffman table stored in an ROM. A two-dimensional Huffman coding which generates a variable length code (coded output) is adopted. A coded signal from the variable length coding circuit 11 is supplied to the following stage.

Relating to the estimate circuit 9, a Huffman table 12 same as that referred to the variable length coding circuit 11 is provided. The Huffman table 12 generates a bit number data of an output data when the variable length coding is carried out. The estimate circuit 9 judges an optimum set of quantization step. The judged output therefrom is supplied to the QNo controller 10. The QNo controller 10 controls the quantization circuit 7 such that it may quantize the coefficient data by using the set of quantization step. Furthermore, the quantization number QNo for identifying the set of quantization step is transmitted from the QNo controller 10 to the following stage.

In the following-stage fixed length framing circuit 13, the data generated by the above process (the DC coefficient DCT, the variable length coded output, the quantization number QNo, the movement flag M, the activity code AT) are converted into a framing structure for an error correction coding process and the recording data. The recording data having a sync block SB structure is obtained from the framing circuit 13. The recording data is recorded on a hard disk.

By the way, in the framing circuit 13, the compressed data shown in FIG. 2A of 5 macro blocks (1 buffer unit) is packed in 5 sync blocks (5 SB) of 25 Mbps shown in FIGS. 2B, 2C, 2D to thereby carry out a framing process for forming the recording data.

Specifically, in FIGS. 2A to 2E, a shading portion denotes an effective data portion, and a blank portion denotes an ineffective data portion. In the framing circuit 13, in the first place, a pass 1 process is carried out such that the macro blocks $MB_1$ to $MB_5$ themselves of the compressed data shown in FIG. 2A may be packed in the macro blocks $MB_1$ to $MB_5$ in corresponding containers whose capacity is 25 Mbps shown in FIG. 2B, respectively.

In this case, when an extra data a is generated, a pass 2 process is carried out so that the extra data a may be packed in the blank portion in the same macro block from the beginning as shown in FIG. 2C.

When an extra data b which cannot be put into the same macro block by the pass 2 process is generated, a pass 3 process is carried out. In the pass 3 process, the extra data b is sequentially packed from the beginning of the blank portion of all the macro blocks $MB_1$ to $MB_5$ shown in FIG. 2D of one buffering unit BU.

In this case, after the framing process, a data format is shown in FIG. 2E. As shown in FIG. 2E, one sync block SB comprises 2 data in a sync data portion and 38 data in an information data portion, that is, 40 data. One data comprises 16 bits. In respective macro blocks MB, for example, as shown in FIG. 2E, the pass 1, pass 2 and pass 3 processes are carried out. Whenever the effective data is over, an end of block EOB is inserted.

In FIG. 2E, a reference symbol QNo denotes the quantization number. A reference symbol STA denotes an error information. A reference symbol AT denotes a classification information. A reference symbol M denotes the movement flag. A reference symbol DC denotes a direct current component information.

When such a framed recording data is recorded in the recording medium such as a hard disk, etc., the capacity of the recording medium such as the hard disk, etc. can be saved.

However, in even such a framed recording data, the ineffective data portion shown in FIGS. 2E and 3A (the blank portion in FIG. 2E and "0" portion in FIG. 6A) exists over a relatively wide portion.

SUMMARY OF THE INVENTION

It is an object of the present invention to provide a digital information data recording and reproducing apparatus which can reduce an ineffective data portion in a recording data and further can save a capacity of recording medium such as a hard disk, etc.

According to one aspect of the present invention, there is provided a digital information data recording apparatus which comprises a compressing coding means for compressing and coding a digital information data, a framing means for framing a compressed coded data obtained at an output side of the compressing coding means by a fixed length format, an ineffective data removing means for removing an effective data from a framing data of the fixed length format obtained at the output side of the framing means, and a recording means for recording an output signal from the ineffective data removing means on a recording medium.

According to the present invention, since the recording data is provided by removing the ineffective data from the framing data of the fixed length format framed by the framing means, the ineffective data portion in the recording data becomes less, and hence the capacity of the recording medium such as the hard disk, etc. can be saved.

BRIEF DESCRIPTION OF THE DRAWINGS

FIGS. 8A to 8U are time charts used for explaining the embodiment shown in FIG. 7;

FIGS. 9A to 9G are a time charts used for explaining the embodiment shown in FIG. 7;

FIGS. 11A to 11K are time charts used for explaining the embodiment shown in FIG. 10.

DETAILED DESCRIPTION OF THE PREFERRED EMBODIMENTS

An embodiment of a digital information data recording and reproducing apparatus according to the present invention will be described with reference to the accompanying drawings.

Figure 1:
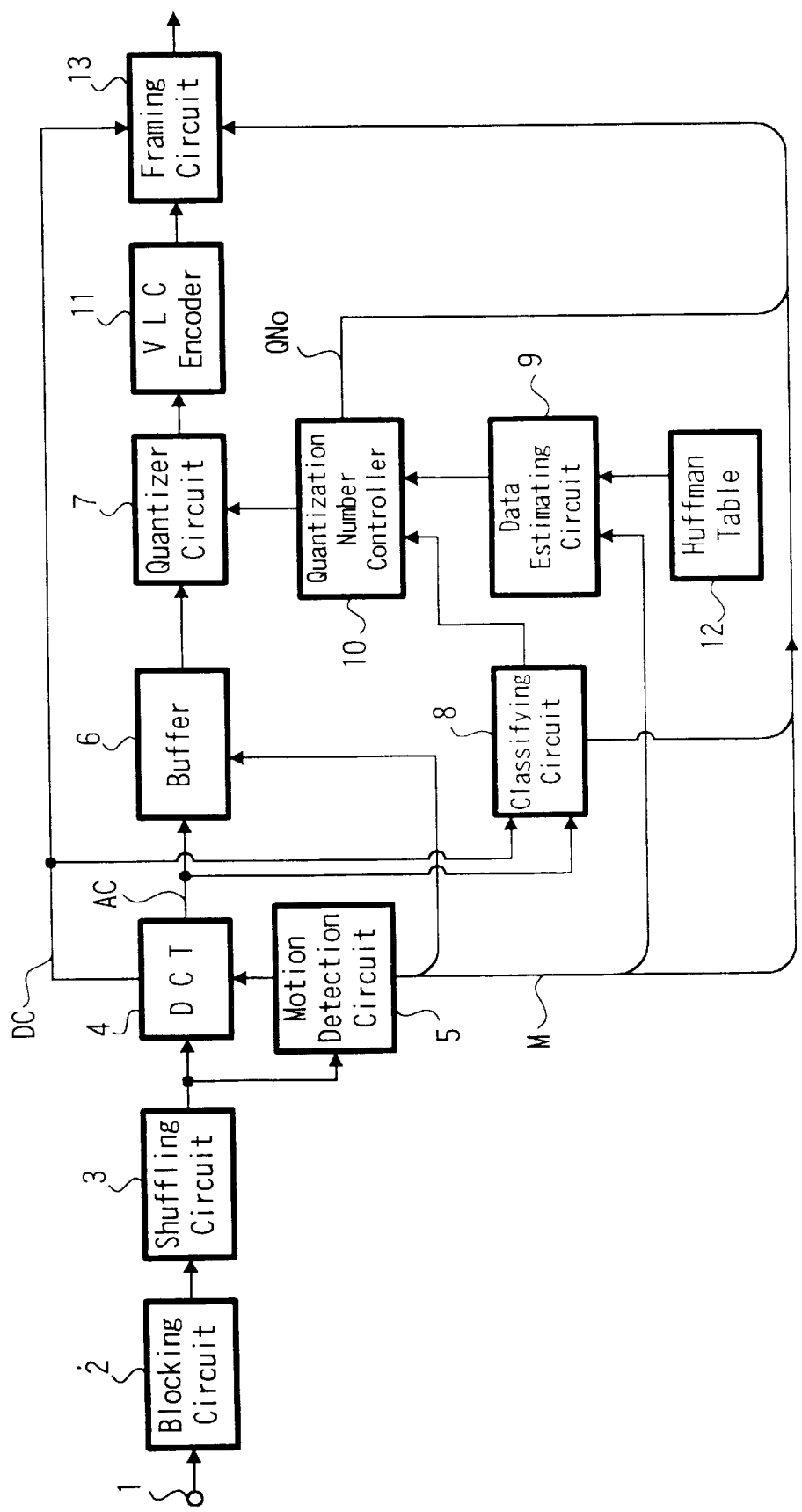
FIG. 1 is a block diagram showing a constitution of an example of a conventional digital information data recording apparatus.
Figure 2A:
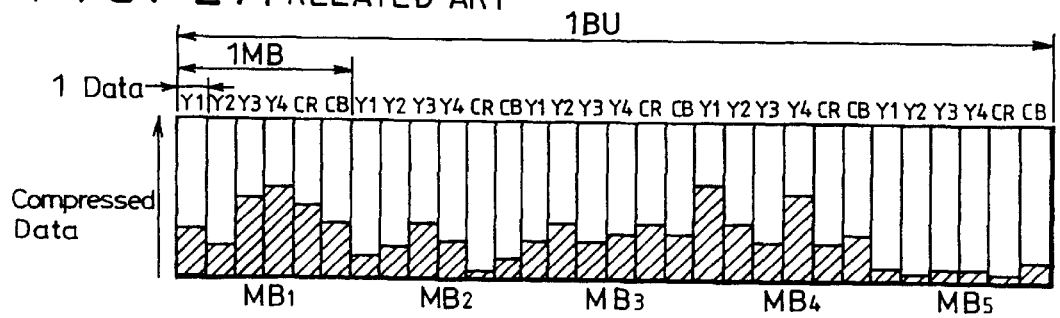
FIGS. 2A to 2E are each a diagram use for explaining a framing process.
Figure 2B:
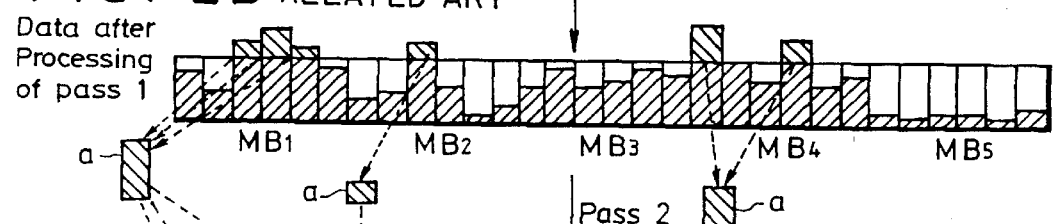
Figure 2C:
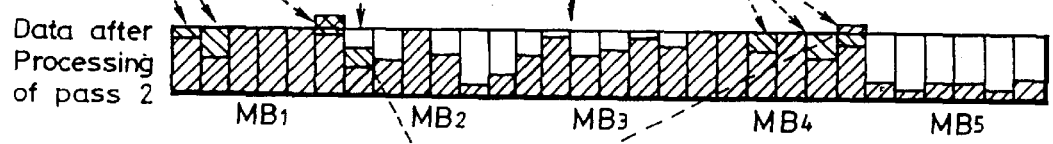
Figure 2D:
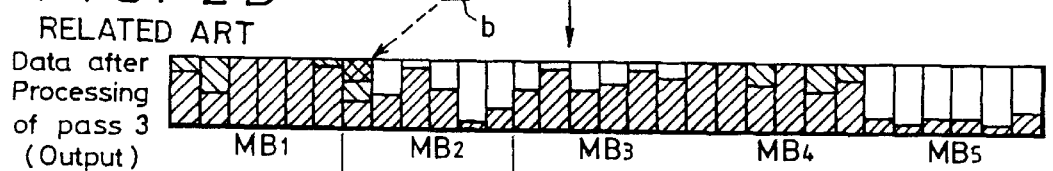
Figure 2E:
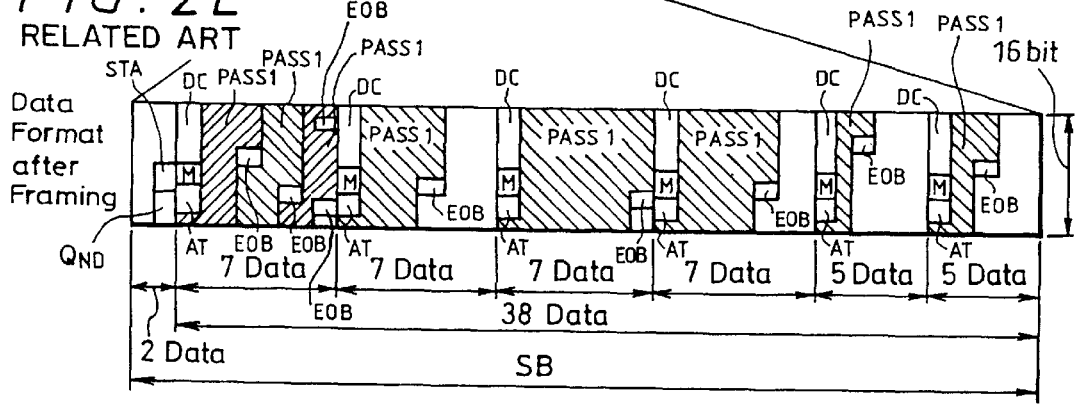
Figure 7:
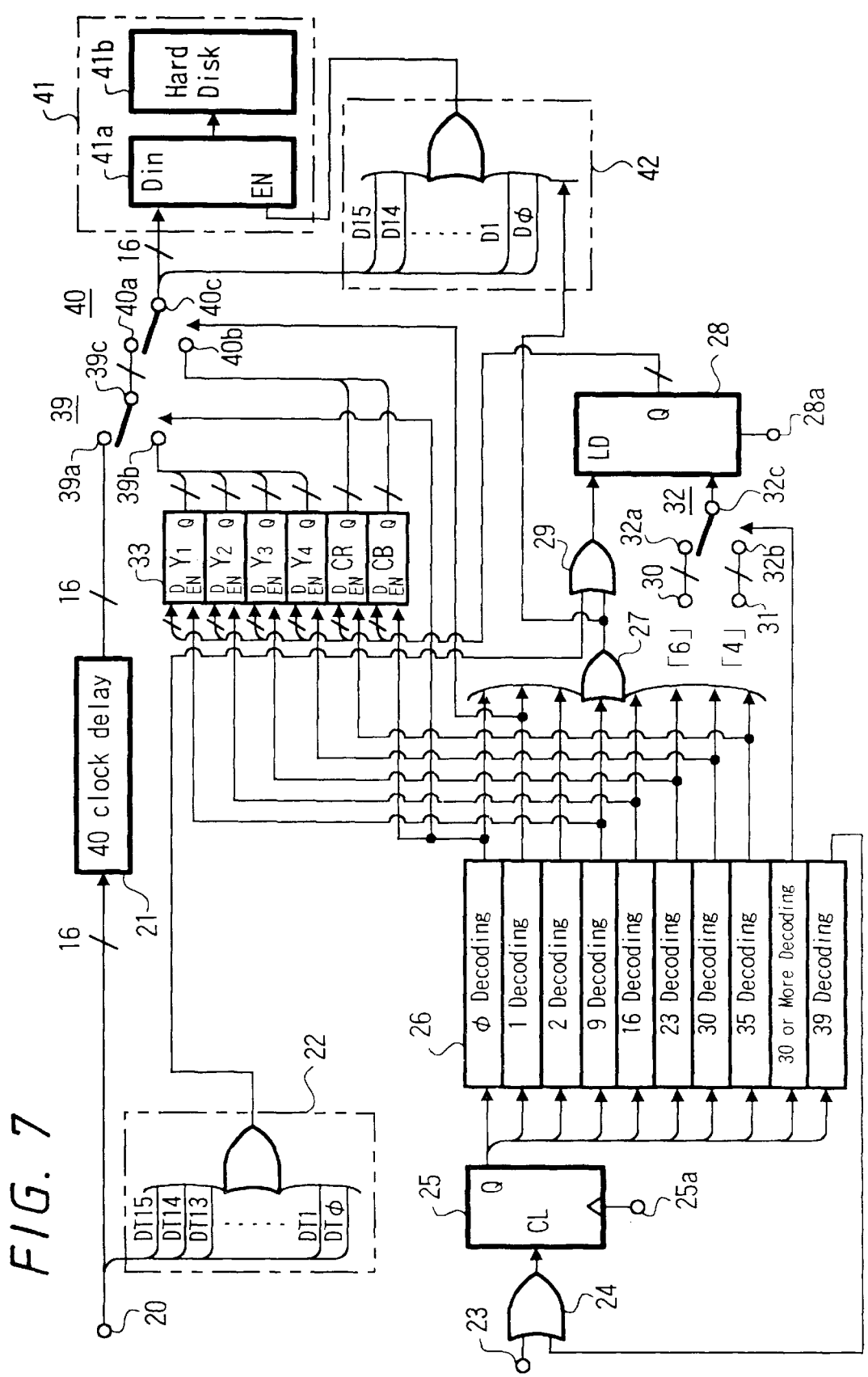
FIG. 7 is a block diagram showing a main portion of an embodiment of the digital information data recording apparatus according to the present invention.

FIG. 7 shows a main portion of an embodiment of the digital information data recording apparatus according to the present invention. According to the present embodiment, the framing data of the fixed length format obtained at the output side of the framing circuit 13 for framing the fixed length format of the digital information data recording apparatus shown in FIG. 1 is supplied to an input terminal 20 shown in FIG. 7. Since FIG. 1 is described above, a description of FIG. 1 is omitted.

Figures 6A, 6B:
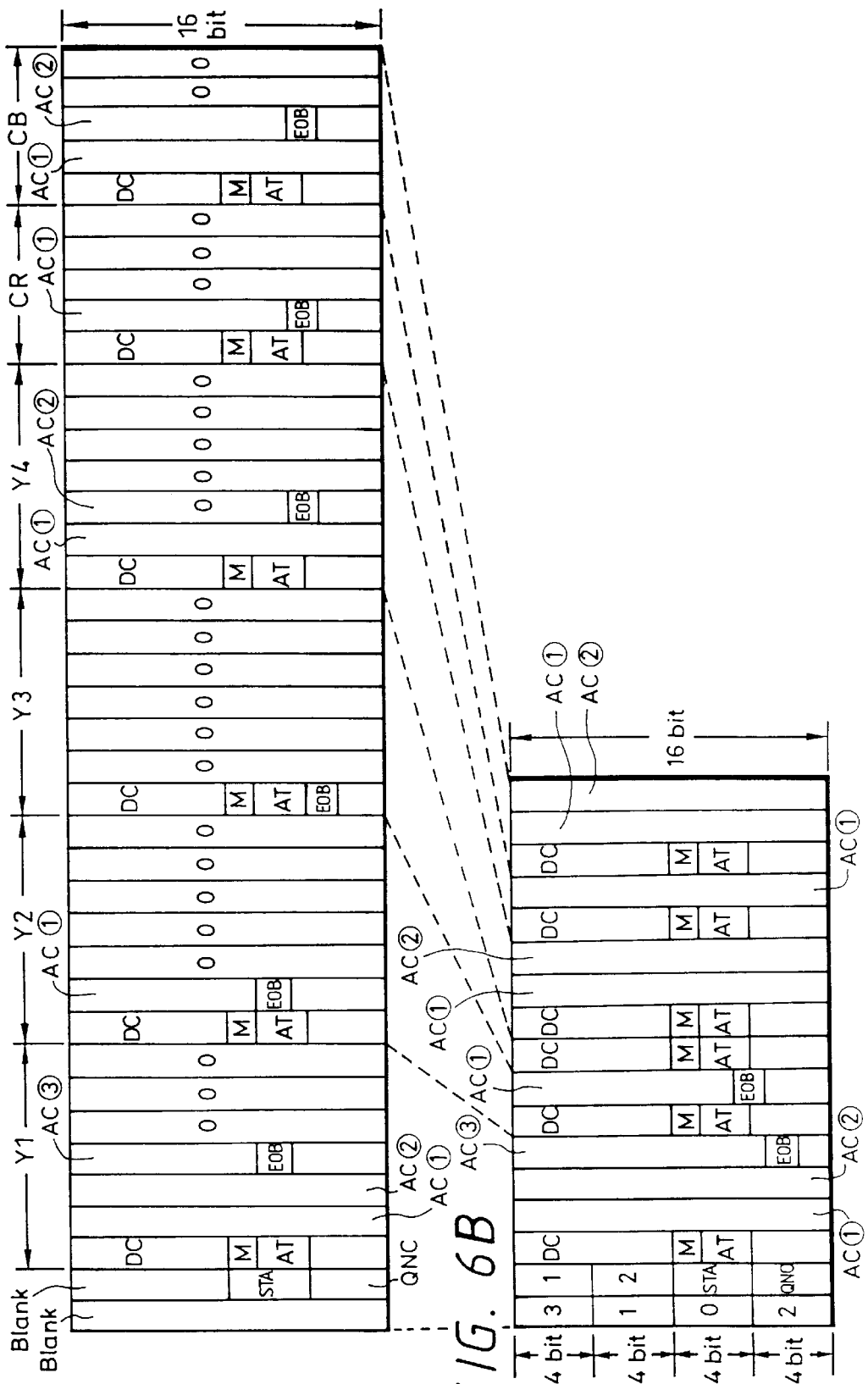
FIGS. 6A and 6B are each a diagram used for a description of the present invention.

According to the present embodiment, for a simple description, as shown in FIG. 6A, the framing data for the fixed length format, that is, the data of a sync block SB is supplied to the input terminal 20.

In the fixed length format shown in FIG. 6A, one sync block SB has 40 data each of which is forty 16-bit data. A first data of the sync data portion is a blank. A next data has an 8-bit blank, and a 4-bit error information STA and a 4-bit quantization number QNo sequentially. Next twenty eight data are divided into four Y blocks $Y_1$, $Y_2$, $Y_3$, $Y_4$, each having seven data. Next every five data are a CR block and a CB block.

As shown in FIGS. 6A and 6B, "0" after an end of block EOB is an ineffective data. In this case, according to the present embodiment, in the first place, "0" is written all over the data. Thenceforth, "0" is rewritten with an effective data.

The framing data for the fixed length format shown in FIGS. 6A and 8B supplied to the input terminal 20 is supplied to a 40-clock delay circuit 21 for delaying the data by a necessary time for processing the data. Furthermore, the framing data is also supplied to an ineffective data detecting circuit 22 for detecting the ineffective data.

The ineffective data detecting circuit 22 judges one data having all 16 bits of "0" to be the ineffective data. Accordingly, according to the present embodiment, the signal shown in FIG. 8G is obtained at the output side of the ineffective data detecting circuit 22.

Furthermore, in FIG. 7, a numeral 23 denotes a buffer unit pulse input terminal. One buffer unit pulse at every forty pulse which trails down at the beginning of the sync block SB, for example, shown in FIG. 8A is supplied to the buffer unit pulse input terminal 23.

The buffer unit pulse supplied to the buffer unit pulse input terminal 23 is supplied to a clear terminal CL of an up counter 25 via an OR gate circuit 24. A clock signal is supplied to a clock terminal 25a of the up counter 25. A count signal shown in FIG. 8C is obtained at an output terminal Q of the up counter 25.

The count signal obtained at the output terminal Q of the up counter 25 is supplied to a decoder 26 in which "0", "1", "2", "9", "16", "23", "30", "35", "30 or more" and "39" decode signals are obtained. The "39" decode signal of the decoder 26 is supplied to the clear terminal CL of the up counter 25 via the OR gate circuit 24, so that the up counter 25 is cleared at every forty clock.

The "0", "1", "2", "9", "16", "23", "30" and "35"decode signals of the decoder 26 are each supplied to an OR gate circuit 27. A mask signal shown in FIG. 8D is obtained at the output side of the OR gate circuit 27. Even if a portion where the mask signal exists is judged to be the ineffective data by the ineffective data detecting circuit 22, the portion is defined to be the effective data.

In FIG. 7, shown at 28 is a down counter. The mask signal shown in FIG. 8D which is obtained at the output side of the OR gate circuit 27 is supplied to a load terminal LD of the down counter 28 via an OR gate circuit 29. Furthermore, an ineffective data detecting signal shown in FIG. 8G, from the ineffective data detecting circuit 22 is supplied to the load terminal LD via the OR gate circuit 29. Accordingly, the load signal shown in FIG. 8H is supplied to the load terminal LD of the down counter 28.

Whenever the load signal becomes a high level "1", the down counter 28 sets a load value. When a count value of the up counter 25 is less than "30", the load value is "6". When the count value is "30" or more, the load value is "4".

Specifically, the load value "6" is inputted to an input terminal 30, and the load value "4" is inputted to an input terminal 31. The input terminal 30 is connected to one fixed contact 32a of a switch 32, while the input terminal 31 is connected to the other fixed contact 32b of the switch 32 and a movable contact 32c of the switch 32 may be switched by the "30 or more" decode signal of the decoder 26 shown in FIG. 8E. The load value shown in FIG. 8F obtained at the movable contact 32c is supplied to a load value input terminal of the down counter 28. A numeral 28a denotes a clock input terminal of the down counter 28 to which a down-counting clock signal is supplied.

The count value shown in FIG. 8I is obtained at the output terminal Q of the down counter 28. The count value obtained at the output terminal Q of the down counter 28 is supplied to data terminals D of latch circuits 33, 34, 35, 36, 37 and 38 for latching an effective data length, respectively. Furthermore, the "9" decode signal of the decoder 26 shown in FIG. 8J is supplied to an enable terminal EN of the latch circuit 33 for latching the effective data length of the $Y_1$, block, so that the effective data length of the $Y_1$ block is latched in the latch circuit 33.

The "16" decode signal of the decoder 26 shown in FIG. 8K is supplied to enable terminal EN of the latch circuit 34 for latching the effective data length of the $Y_2$ block, so that the effective data length of the $Y_2$ block is latched in the latch circuit 34.

The "23" decode signal of the decoder 26 shown in FIG. 8L is supplied to an enable terminal EN of the latch circuit 35 for latching the effective data length of the $Y_3$ block, so that the effective data length of the $Y_3$ block is latched in the latch circuit 35.

The "30" decode signal of the decoder 26 shown in FIG. 8M supplied to an enable terminal EN of the latch circuit 36 for latching the effective data length of the $Y_4$ block, so that the effective data length of the $Y_4$ block is latched in the latch circuit 36.

Furthermore, the "35" decode signal of the decoder 26 shown in FIG. 8N is supplied to an enable terminal EN of the latch circuit 37 for latching the effective data length of the CR block, so that the effective data length of the CR block is latched in the latch circuit 37.

The "0" decode signal of the decoder 26 shown in FIG. 80 is supplied to an enable terminal EN of the latch circuit 38 for latching the effective data length of the CB block, so that the effective data length of the CB block is latched in the latch circuit 38.

According to the present embodiment, an input signal which is obtained at the output side of the 40-clock delay circuit 21 and is delayed by forty clocks shown in FIG. 9A is supplied to one fixed contact 39a of a switch 39. The effective data length headers of the $Y_1$, $Y_2$, $Y_3$, $Y_4$ blocks obtained at the output sides of the latch circuits 33, 34, 35, 36 and shown in FIGS. 4P, 4Q, 4R, 4S are all supplied to the other fixed contact 39b of the switch 39.

A movable contact 39c of the switch 39 is controlled in switching by the "0" decode signal shown in FIG. 9B. The movable contact 39c is connected to the other fixed contact 39b during 1-bit period alone where the "0" decode signal exists so that the effective data length headers "3", "1", "0", "2" of the $Y_1$, $Y_2$, $Y_3$, $Y_4$ blocks may be inserted. During other periods, the movable contact 39c is controlled so that the movable contact 39c is connected to the one fixed contact 39a.

The signal obtained at the movable contact 39c of the switch 39 is supplied to one fixed contact 40a of a switch 40. The effective data length headers of the CR and CB blocks obtained at the output sides of the latch circuits 37 and 38 and shown in FIGS. 8T and 8U are supplied to the other fixed contact 40b of the switch 40.

A movable contact 40c of the switch 40 is controlled is switching by the "1" decode signal of the decoder 26 shown in FIG. 9C. The movable contact 40c is connected to the other fixed contact 40b during the 1-bit period alone where the "1" decode signal exists so that the effective data length headers "1" and "2" of the CR and CB blocks may be inserted. During other periods, the movable contact 40c is controlled in switching so that the movable contact is connected to the one fixed contact 40a.

As shown in FIG. 9D, the sync block SB to the beginning portion of which the effective data length headers "3", "1", "0", "2" of the $Y_1$, $Y_2$, $Y_3$, $Y_4$ blocks and the effective data length headers "1", "2" of the CR and CB blocks are added at its blank portion shown in FIGS. 6A and 8B is supplied to a data input terminal Din of a buffer memory 41a of a hard disk recording device 41. The sync block is also supplied to a write-enable signal generating circuit 42 which produces a write-enable signal for controlling a write of the buffer memory 41a.

At every time when a predetermined amount of a recording data is memorized in the buffer memory 41a, the hard disk recording device 41 is operated so as to record the recording data at a predetermined position of a hard disk 41b.

The write-enable signal generating circuit 42 is operated so that an ineffective data judge signal shown in FIG. 9F in which all the 16 bits of the data of the input signal are at a low level "0" and the mask signal shown in FIG. 9E which is obtained at the output side of the OR gate circuit 27 may take OR. At the output side of the write-enable signal generating circuit 42, a write-enable signal shown in FIG. 9G is obtained.

The write-enable signal obtained at the output side of the write-enable signal generating circuit 42 is supplied to a write-enable signal input terminal EN of the buffer memory 41a of the hard disk recording device 41.

The buffer memory 41a stores the input signal supplied to the data input terminal $D_{in}$ only when the write-enable signal is at a high level "1".

That is, according to the present embodiment, when the sync block SB supplied to the input terminal 20 is the data shown in FIG. 6A, the recording data stored in the buffer memory 41a becomes the signal comprising the portion where the mask signal added to the effective data length header shown in FIG. 6B exists and an effective data portion, in which other ineffective data is removed.

Accordingly, according to the present embodiment, the signal shown in FIG. 6B is recorded in the hard disk 41b. Accordingly, according to the embodiment, since the ineffective data portion becomes less in the recording data, there is such an advantage that a capacity of the hard disk 41b can be further saved.

Next, an example of the digital information data reproducing apparatus for reproducing the hard disk 41b recorded by the above-mentioned digital information data recording apparatus will be described with reference to FIG. 10 and FIGS. 11A to 11K.

Figure 10:
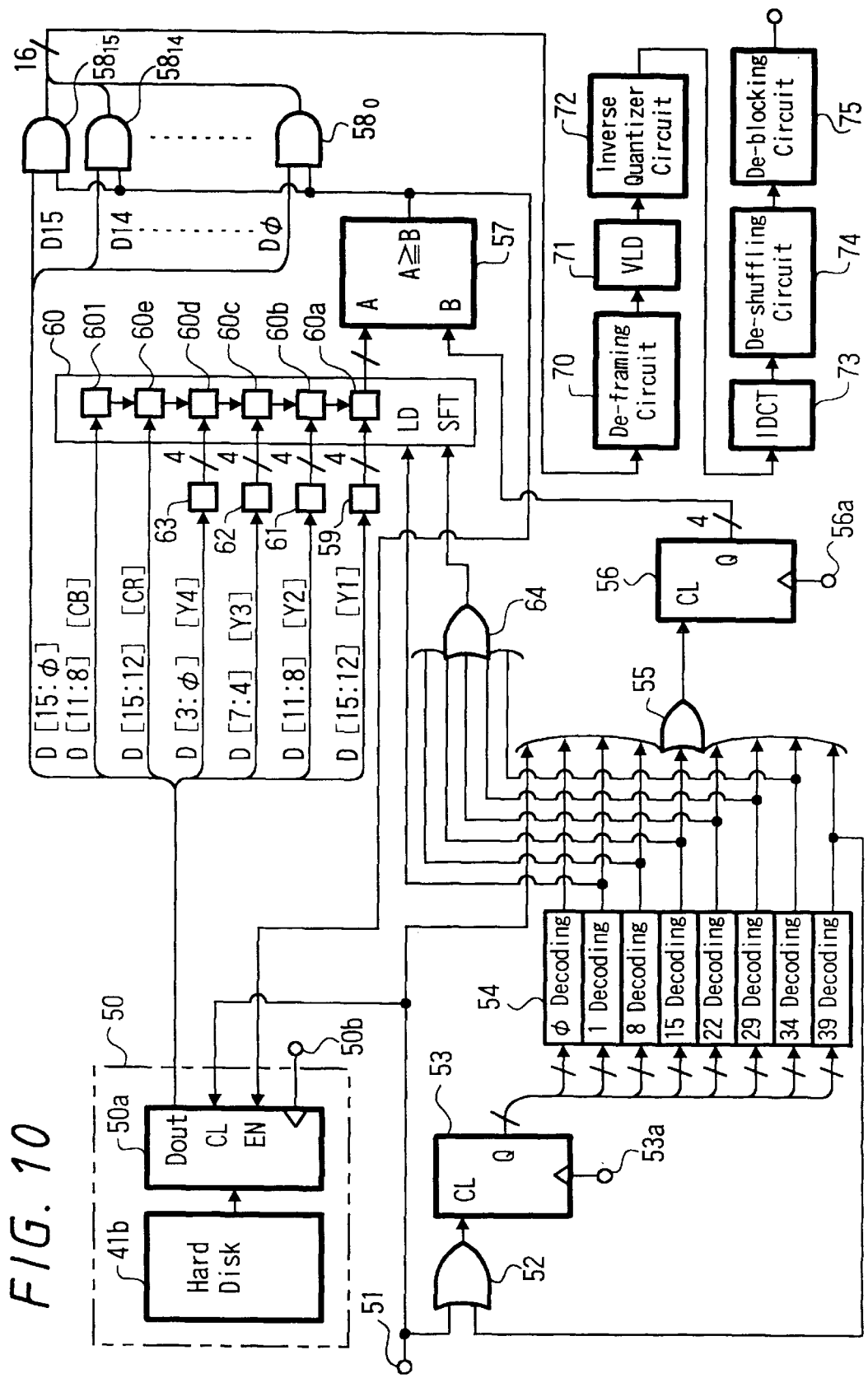
FIG. 10 is a block diagram showing an embodiment of the digital information data reproducing apparatus according to the present invention.

As shown in FIG. 10, there is provided a hard disk reproducing apparatus 50. The hard disk reproducing apparatus 50 outputs a reproducing signal from the hard disk 41b via a buffer memory 50a. From when a clear signal is supplied to a clear terminal CL of the buffer memory 50a, when the enable signal supplied to its enable terminal EN is at the high level "1", and at every time when the clock signal is supplied to a clock terminal 50b, the buffer memory 50a is operated so as to output one data (16 bits) from its data output terminal $D_{out}$.

Furthermore, to a start signal input terminal 51 supplied is a start signal for starting a reproducing operation shown in FIG. 11A. The start signal supplied to the start signal input terminal 51 is supplied to the clear terminal CL of the buffer memory 50a of the hard disk reproducing apparatus 50. Furthermore, the start signal is supplied to a clear terminal CL of a counter 53 via an OR gate circuit 52.

The counter 53 counts a clock signal shown in FIG. 11K. A count signal shown in FIG. 11B which is obtained at the output terminal Q of the counter 53 is supplied to a decoder 54 from which decode signals "0", "1", "8", "15", "22", "29", "34" and "39" are obtained.

The "39" decode signal of the decoder 54 is supplied to the clear terminal CL of the counter 53 via the OR gate circuit 52, so that the counter 53 is cleared at every forty clocks.

Furthermore, the start signal and the decode signals "0", "1", "8", "15", "22", "29", "34" and "39" of the decoder 54 are all supplied to an input side of an OR gate circuit 55, respectively. A clear signal shown in FIG. 11C which is obtained at the output side of the OR gate circuit 55 is supplied to a clear terminal CL of a counter 56.

The counter 56 is operated so as to count the clock signal shown in FIG. 11K which is supplied to a clock input terminal 56a. A count signal shown in FIG. 11D which is obtained at the output side of the counter 56 is supplied to a B signal input terminal of a comparator 57 described later on.

Furthermore, 16 bits, data $D_0$, $D_1$, ... $D_{15}$ obtained at the data output terminal Dout of the buffer memory 50a of the hard disk reproducing apparatus 50 are supplied to one input terminals of AND gate circuits $58_0$, $58_1$, ... $58_{15}$, respectively.

Furthermore, bits $D_{12}$ to $D_{15}$ among the 16 bits $D_0$, $D_1$, ... $D_{15}$ of the data obtained at the data output terminal $D_{out}$ of the buffer memory 50a are supplied to a first shift register portion 60a of a shift register 60 via a 1-clock delay circuit 59. The bits $D_8$ to $D_{11}$ thereof are supplied to a second shift register portion 60b of the shift register 60 via a 1-clock delay circuit 61. The bits $D_4$ to $D_7$ thereof are supplied to a third shift register portion 60c of the shift resister 60 via a 1-clock delay circuit 62. The bits $D_0$ to $D_3$ thereof are supplied to a fourth shift register portion 60d of the shift register 60 via a 1-clock delay circuit 63.

Furthermore, the bits $D_{12}$ to $D_{15}$ among the 16 bits $D_0$, $D_1$, ... $D_{15}$ of the data obtained at the data output terminal $D_{out}$ of the buffer memory 50a are supplied to a fifth shift register portion 60e of the shift register 60. The bits $D_8$ to $D_{11}$ thereof are supplied to a sixth shift register portion 60f of the shift register 60.

The "1" decode signal of the decoder 54 shown in FIG. 11E is supplied to a load terminal LD of the shift register 60. When the "1" decode signal is supplied, the effective data length header is supplied to the first to sixth shift register portions 60a to 60f.

In this case, when the recording data is one as shown in FIG. 6B, the effective data length "3" of the $Y_1$ block is supplied to the first shift register portion 60a. The effective data length "1" of the $Y_2$ block is supplied to the second shift register portion 60b. The effective data length "0" of the $Y_3$ block is supplied to the third shift register portion 60c. The effective data length "2" of the Y4 block is supplied to the fourth shift register portion 60d. The effective data length "1" of the CR block is supplied to the fifth shift register portion 60e. The effective data length "2" of the CB block is supplied to the sixth shift register portion 60f.

Furthermore, in the shift register 60, the first to sixth shift register portions 60a to 60f are connected in series. At every time when a shift pulse is supplied to a shift pulse terminal SFT of the shift register 6D, one shift register portion is shifted. The effective data length shown in FIG. 11G which is obtained at the first shift register portion 60a is sequentially supplied to an A signal input terminal of the comparator 57.

Furthermore, a shift pulse shown in FIG. 11F which is obtained at the output side of an OR gate circuit 64 by supplying the decode signals "8", "15", "22", "29", "34" of the decoder 54 to the input side of an OR gate circuit 64, is supplied to the shift pulse terminal SFT.

An A signal supplied to the A signal input terminal is compared to a B signal to be supplied to the B signal input terminal in the comparator 57. As shown in FIG. 11H, when $A \geq B$, the high level "1" is outputted to the output side of the comparator 57, while when A<B, the low level "0" is outputted to the output side thereof.

The output signal from the comparator 57 shown in FIG. 11H is supplied to the enable terminal EN of the buffer memory 50a. The output signal from the comparator 57 is supplied to the other input terminal of each of the sixteen AND gate circuits $58_0$, $58_1$, ... $58_{15}$.

Figure 3:
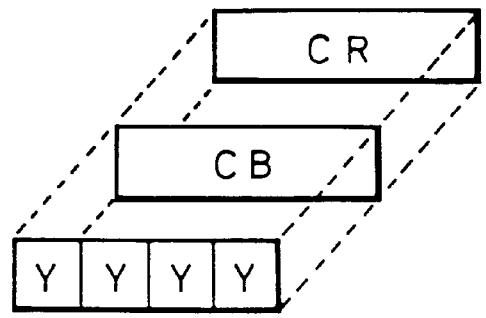
FIG. 3 is a diagram accompanied with a description of FIG. 1.
Figure 4:
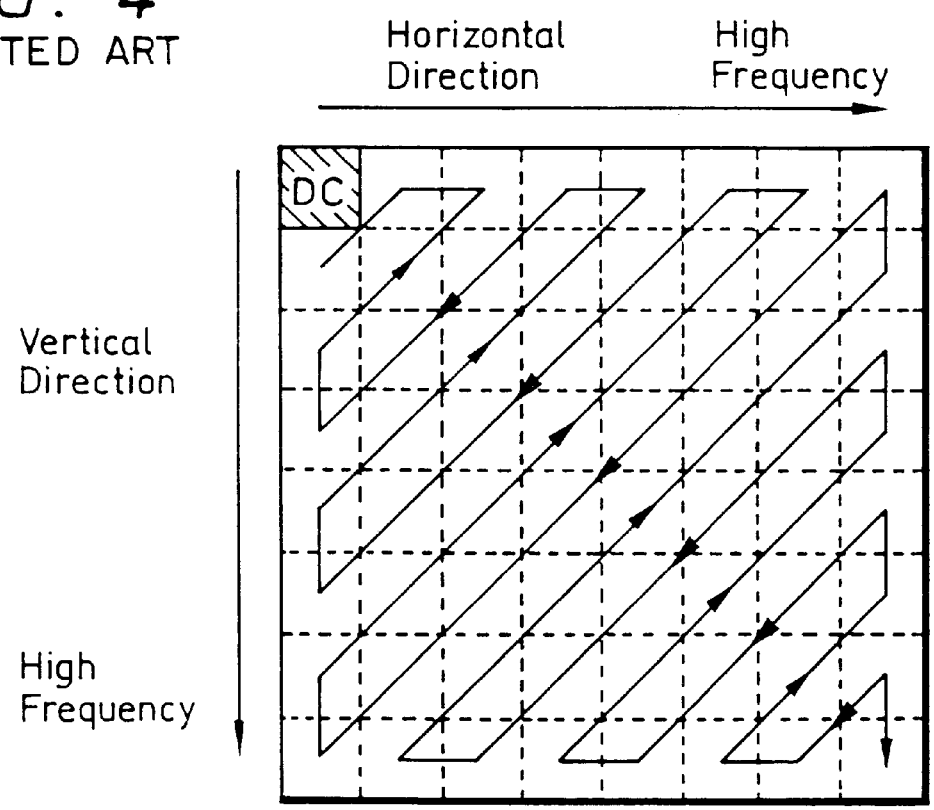
FIG. 4 is a diagram accompanied with a description of FIG. 1.
Figure 5:
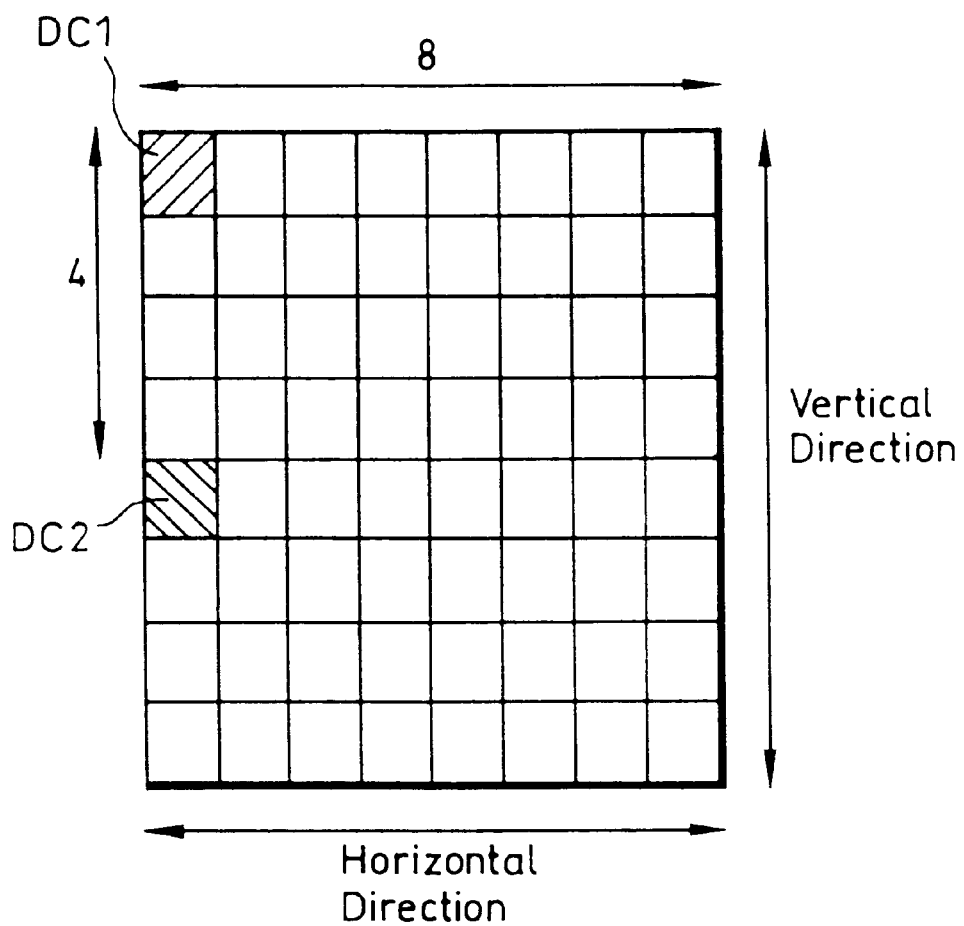
FIG. 5 is a diagram accompanied with a description of FIG. 1.

Accordingly, the signal of the fixed length format of the sync bit SB shown in FIG. 11I in which the effective data shown in FIG. 3B is inserted and other portions are the DC data is obtained at the data output terminal Dout of the buffer memory 50a. As shown in FIG. 11J, the fixed length format sync block SB shown in FIG. 6A in which a dummy data "0" is inserted according to the effective data length is obtained at the output side of the sixteen AND gate circuits $58^0$, $58^1$, ... $58_{15}$.

The reproducing signal shown in FIG. 11J which is obtained at the output side of the sixteen AND gate circuits $58_0$, $58^1$, ... $58_{15}$ is supplied to a reproducing apparatus comprising a deframing circuit 70, a variable length decoding circuit 71, an inverse quantization circuit 72, an inverse DCT circuit 73, a deshuffling circuit 74, a deblocking circuit 75, etc. similar to the prior art so that the reproduced signal similar to the prior art can be obtained.

According to the above embodiment, an addition of the effective data length header is describes above. Instead of this, it is easily understood that an ineffective data length header may be added.

Furthermore, according to the above embodiment, the addition of the data length header is described above. Without adding the data length header, after a reproduction, the EOB is detected, and a break-point of a DCT block is found. Naturally, the dummy data is put into the blank so that the data may be outputted.

Furthermore, according to the above embodiment, after framing, whether or not all the bits of the framed ineffective data (blank) are at the low level "0" is judged and detected. Naturally, the ineffective data may be detected by any other methods.

According to the digital information data recording and reproducing apparatus the digital information data, the ineffective data (blank) is removed from the framing data of the fixed length format framed by the framing means, so that the data is defined as the recording data. Accordingly, the ineffective data (blank) in the recording data becomes less, and there is such an advantage that the capacity of a recording medium such as the hard disk, etc. can be further saved.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A digital information data recording apparatus comprising:

a compressing coding means for compressing and coding a digital information data;

a framing means for framing a compressed coded data obtained at an output side of said compressing coding means by a fixed length format;

an ineffective data removing means for removing an effective data from a framing data of the fixed length format obtained at an output side of said framing means; and a recording means for recording an output signal from said ineffective data removing means on a recording medium.

2. The digital information data recording apparatus according to claim 1 further comprising:

a header adding means for adding a data length header.

3. A digital information data reproducing apparatus for reproducing a digital information data from a recording medium in which an ineffective data is removed from a framing data of a fixed length format and then which is recorded in a recording medium, comprising:

a reproducing means for reproducing a data from said recording medium; and a dummy data inserting means for inserting a dummy data into said data reproduced by said reproducing means so as to be matched to said fixed length format.

4. The digital information data reproducing apparatus according to claim 3, wherein said dummy data inserting means inserts said dummy data according to the data length header included in said data reproduced by said reproducing means.

* * * * *